Dec. 27, 1955   C. R. TURNER   2,728,842
WATTAGE CONTROLLER SYSTEM
Filed Feb. 25, 1952
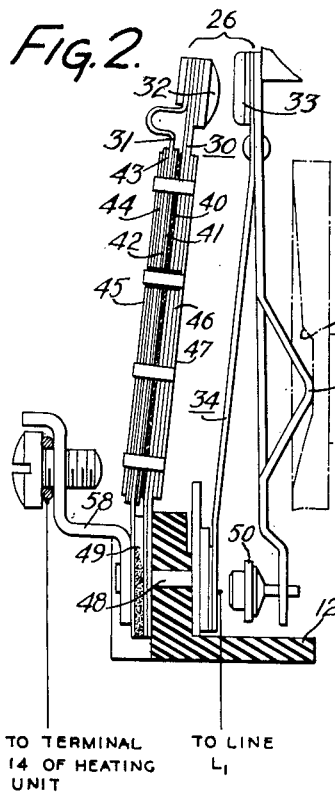
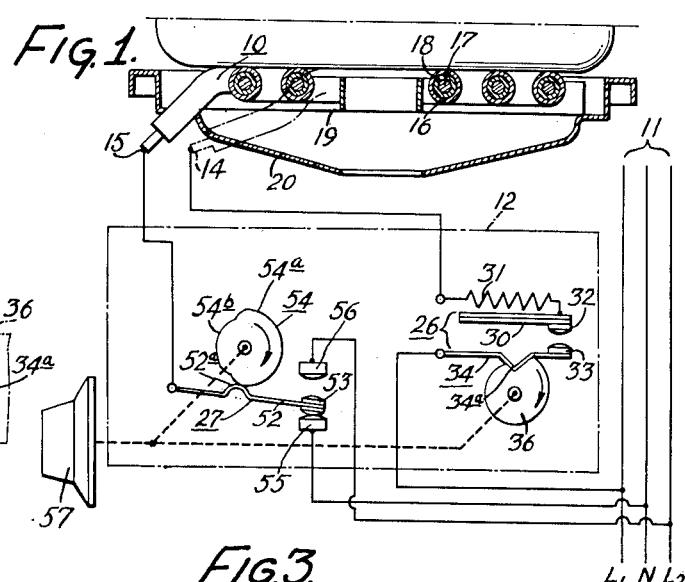
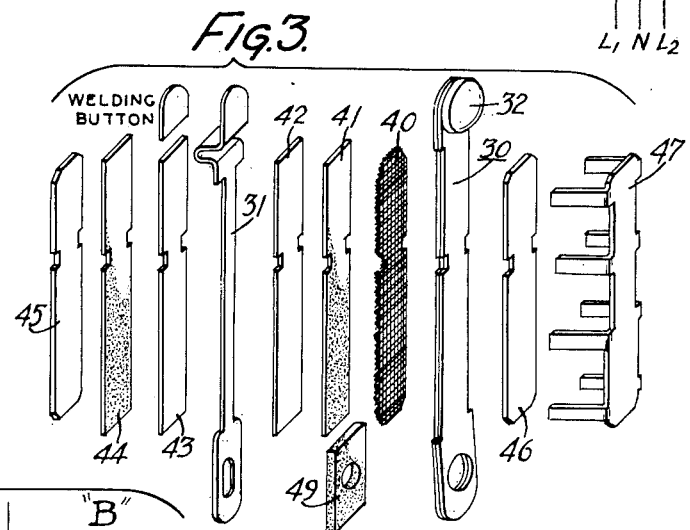
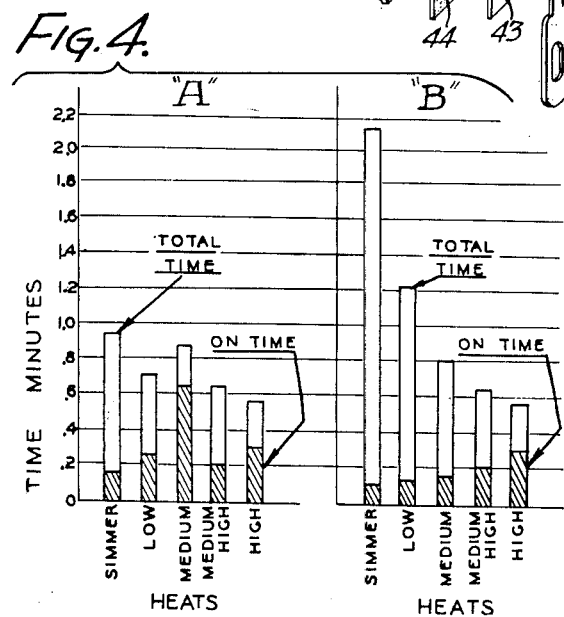
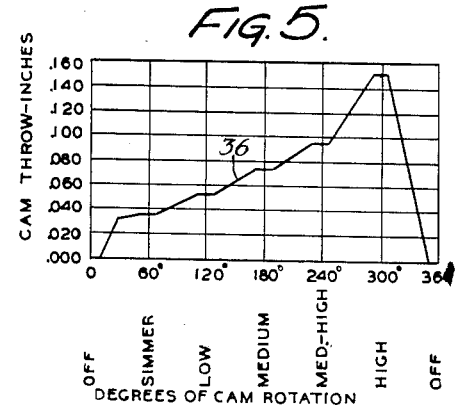
Inventor:
Charles Roger Turner
by his Attorneys
Howson & Howson United States Patent Office 2,728,842
Patented Dec. 27, 1955

2,728,842

WATTAGE CONTROLLER SYSTEM

Charles Roger Turner, Springfield Township, Montgomery County, Pa., assignor to Proctor Electric Company, Philadelphia, Pa., a corporation of Pennsylvania Application February 25, 1952, Serial No. 273,282

8 Claims. (Cl. 219—20)

The present invention relates to a wattage controller system for controlling an electric heating load such as an electric range surface heating unit. It is a prime object of this invention to provide a control that will effect rapid energization of a heating unit until the desired operating temperature is reached, with subsequent energization to maintain the heating unit at that selected temperature value.

A further object is to provide a system to bring a heating unit rapidly to a selected temperature that will utilize an initial instantaneous energization rate that is greater than that required to maintain the heating unit at the maximum designed "heat" and thereafter will cyclically energize and deenergize at the high instantaneous energization rate to thereby maintain the heating unit at its maximum "heat" after the unit has reached the predetermined temperature value.

Another object is to provide a control system that utilizes a thermal wattage controller to give the various average wattage inputs to the heating unit, wherein one range of inputs is effected through a wattage input in excess of the maximum the unit could normally tolerate continuously, while utilizing, at another range of inputs, a wattage considerably less than the maximum the unit could tolerate continuously.

A further object is to provide a system that will permit the economy of using a single coil heating unit.

The type of thermal wattage controller contemplated is characterized in that it provides a particular wattage input or "heat" by cyclically energizing and deenergizing the heating unit. In systems of this type, the thermal wattage controller should not cycle on and off too frequently. The maximum number of cycles in any period of time is established at about 2 per minute. This is not considered excessive from the standpoint of contact life, radio interference, etc. On the other hand, in systems of this type, the length of the individual "on" plus "off" intervals should not exceed a certain maximum. This is especially important in the lower range of inputs because excessive "off" intervals are synonymous with large overshoot and undershoot and inherent difficulty in maintaining correct average temperature at the unit.

It is therefore, another object to provide a controller that will permit rapid energization of a single coil heating unit and will have favorable cycle lengths at the various heat levels.

Briefly, the present invention contemplates the energization of a single coil electric range heating unit from a 3-wire electrical supply through a controller which, by way of example, has the following characteristics: Assuming the maximum wattage for the heating unit at 1250, "High" heat equivalent to 1250 watts and "Medium High" heat equivalent to approximately 690 watts are obtained by cyclically making and breaking a 2400 watt-second/second circuit to the heating unit; and the lower heats, namely: "Medium," "Low," and "Simmer" are obtained by cyclically energizing the heating unit at 600 watt-second/second. By using the 2400-watt-second/second energization, the heating unit is rapidly brought to its desired temperature level corresponding to the input selected. Utilizing the 600 watt-second/second energization in the lower heats, provides better cycle length characteristics and less inherent fluctuation due to overshoot and undershoot than otherwise might be expected at the lower wattage levels.

Referring now to the accompanying drawing:

Fig. 1 is a schematic diagram of the control system for the heating unit;

Fig. 2 is a detailed elevational view of a preferred form of the thermal switch;

Fig. 3 is an exploded view of the thermomotive unit of the switch of Fig. 2;

Fig. 4 is a comparison chart of the cycle lengths at the various "heats" when operating at various energization levels; and Fig. 5 shows in graphical form the contour of the cam used with the thermal switch.

Fig. 1 shows a heating unit 10 connected to a 3-wire electrical supply line 11 through a controller 12. Heating unit 10 is of the rod type generally used for electric range surface units and is made up of one continuous resistance coil so that there are only two terminal connections 14 and 15. Heating units of the rod type are well known in the art, and it will suffice to say that such unit comprises a metallic sheath 16, and inner coil resistance wire 17, held in place by a heat conducting and electrically insulating ceramic material 18. The unit rests on a spider designated as 19 and is supported on the top of an electric range through a reflector 20 and other constructional elements. The supply line 11 comprises lines $L_1$ and $L_2$ and a neutral or common wire N. In the discussion to follow the voltage between $L_1$ and $L_2$ and N will be taken nominally as 118 volts, while the voltage between $L_1$ and $L_2$ will be taken nominally as 236 volts.

The controller 12 is shown to include a thermal switch 26 and a double-throw single-pole switch 27, both insulatedly supported in or on the controller 12. The thermal switch 26 is preferably of the type disclosed and claimed in a copending application of Walter H. Vogelsberg, Serial No. 157,932, filed April 25, 1950, now Patent 2,623,137 and includes the improvements thereon shown in a copending application of Daniel E. Clapp, Serial No. 246,098, filed September 11, 1951, now Patent 2,673,444. The thermal device comprises a bimetallic element 30 normally fixed at one end and secured to the bimetal at its free end, and an electrical contact 32 carried on the free end of bimetal 30. In Fig. 1, the bimetallic element 30 is arranged to flex upward, having its low expansion side up. A cooperating contact 33 is carried on an adjustable blade 34 which is biased toward cam 36 and is positioned thereby through a cooperating projection 34a on blade 34. Cam 36 has an "off" position in which the projection 34a seats in a recess of the cam, and the cam has a progressively rising surface in the counter-clockwise direction as viewed in Fig. 1.

Figs. 2 and 3 shows the preferred form of the thermal switch 26 for specific use with a heating unit of 2400 watts maximum energization. Between the bimetal 30 and the heater 31, as shown more clearly in Fig. 3, are disposed a rectangular strip of metallic screening 40, an asbestos strip 41, and a mica strip 42. On the left-hand side of the heater 31 are disposed a mica strip 43, an asbestos strip 44, and a brass shim 45. On the right-hand side of bimetal 30 are disposed a brass strip 46 and a brass clamping strip 47. The entire structure is fixedly supported on the switch case 12 through a rivet 48. An insulator 49 separates the base of bimetal 30 and heating element 31. As may be seen in Fig. 2, one electrical connection to the thermal switch is connected to heater 31 through a terminal 58, while the other electrical connection is connected to resilient blade 34 which is insulated from heater 31 and from bimetal 30.

The bimetal used in this particular embodiment is known to the trade as Morflex and is .035" thick; and the heater is of 80% nickel, 20% chrome and has an approximate resistance of .084 ohm. The wire screening is of 30 x 30 mesh and of .015" diameter stainless steel wire, calendered to .030" thickness. The brass strips 45, 46 and 47 are each .010" thick. The asbestos strips are of the Quinterra grade and are .005" thick, while the mica strips are .001" thick. In normal application this wattage controller has an additional bimetal 50, shown in part in Fig. 2, to compensate for changes in ambient and thereby make wattage inputs independent of any such changes. Further details concerning the features of this type of thermostatic switch and its mode of operation are described in the aforementioned applications.

Referring again to Fig. 1, the single-pole, double-throw switch 27 comprises a cantilever-mounted flexible blade 52 carrying a contact 53 at its free end. The switch blade 52 is biased upwardly, e. g. by its own resilience, and has a projection 52a which cooperates with a cam 54, said cam having a raised profile 54a and a lower profile 54b. When profile 54a engages projection 52a of blade 52, contact 53 engages a stationary contact 55. On the other hand, when profile 54b determines the position of blade 52, contact 53 engages a stationary contact 56. Cams 54 and 36 are controlled by manual adjusting member or knob 57 and are adapted to move simultaneously. These cams, while shown as separate members, can be integrally formed in a single profile or face cam member.

The connections are as follows: Blade 34 is connected to line $L_1$, heater 31 is connected to one end 14 of the heating unit 10, blade 52 is connected to the other end 15 of the heating unit, stationary contact 55 is connected to the neutral or common line N, and contact 56 is connected to line $L_2$.

In operation, the user turns the manual knob 57 of the controller 12 to get any one of a number of heats. Cam 54 controls the connections according to the heat selected, while cam 36 controls the operation of the wattage controller according to the heat selected. Usually the selectable heats will be those which have been termed in the electric range art as the "High," "Medium High," "Medium," "Low" and "Simmer" heats. The following table shows the wattages corresponding to these heats and also shows how the heats are obtained:

| Heat | I<br>Average wattage, watts | II<br>Energization during "on" period, Watts | III<br>Percentage Energization I÷II×100, Energized |
|---|---|---|---|
| | | | Percent |
| "High" | 1,250 | 2,400 | 52.1 |
| "Medium High" | 687 | 2,400 | 28.6 |
| "Medium" | 437 | 600 | 73 |
| "Medium Low" | 250 | 600 | 41.7 |
| "Simmer" | 113 | 600 | 18.8 |

The wattages given are obtained by cyclically energizing and deenergizing the heating unit 10 so that the wattages are averages over a period of time and not the energization that would result from the continuous connection of a resistance across a given voltage. The "High" and "Medium High" heats are obtained by cyclically energizing and deenergizing the heating unit 10 when the controller is set to energize the heating unit across lines $L_1$ and $L_2$, i. e., 236 volts. In this condition, the wattage drawn at any instant of energization is 2400 watts. The connections necessary to obtain this type of energization can be traced in Fig. 1 from line $L_1$ through blade 34 to contacts 33 and 32, heater 31, heating unit 10, blade 52, stationary contact 56 and thence to line $L_2$. Thus to obtain the 1250 watts corresponding to the "High" heat, the table indicates that 52.1% energization is necessary, while at the "Medium High" heat an energization of approximately 28.6% is necessary.

At the lower heats, the heating unit 10 is energized between line $L_1$ and the neutral line N. The circuit is traced from line $L_1$, blade 34, contact 33, contact 32, heater 31, heating unit 10, blade 52, stationary contact 55, thence to line N. Since the voltage now being applied across the heating unit is ½ that of the previously described energization, the wattage would be ¼, or in the example chosen, 600 watts. Referring to the above table, "Medium" heat is indicated as being 73%, "Low" heat is indicated as 41.7% and "Simmer" as 18.8%—all at 600 watts instantaneous during an energization interval.

It is to be understood that the values set forth in the above table are not limiting values but are arbitrarily chosen to be commensurate with established practice and with respect to such other factors as life characteristics of the heating unit and the thermal wattage controller.

In order to obtain operation according to the above table, the cam 54 is designed to provide the connections as set forth above for the higher and lower heats, while the cam 36 is designed to effect the adjustments of blade 34 which will give the time percentages of energization for the different wattages. Fig. 5 shows the cam throws employed in the preferred embodiment. It will be seen that as higher inputs are selected that cam race 36 will result in greater initial displacement of blade 34 toward the left as viewed in Fig. 2. This in turn requires that the thermomotive member 30 be operated at a higher average temperature for the cyclic energization and deenergization of contacts 32 and 33 to occur.

It will be apparent that by going to the higher wattage input, the heating unit will attain its operating temperature in a much shorter time than if the heating unit were energized from a cold start continuously at a rate corresponding to the nominal high heat value. In the aforementioned embodiment of the present invention, the time required to attain 100% heat is approximately 1.2 minutes, while with continuous 1250 watt energization, approximately 3 minutes would be required to bring the heating unit to temperature.

It is to be noted that the thermal wattage controller used to govern the input to the heating unit has associated therewith a predetermined thermal mass to dissipation ratio. Thermal switch 26, with its associated mass-providing shims 46 and 47 provides a device that senses the previous heating history of the heating unit 10. Thus, if heating unit 10 had been previously run at its "High" heat, and then the unit is turned on after a short lapse of time, the thermostat would permit only a short interval of energization at the 2400 watt level and thereby prevent damage to the heating unit. The thermostat would thereafter cyclically deenergize and re-energize the heating unit at 2400 watts during any "on" cycle, so as to provide an average wattage of 1250.

Fig. 4 shows at A the "on" times and the total cycle time intervals to attain the respective heats with the present invention. The values given at B indicate the "on" and the total cycle times that would be prevalent if 2400 watts were used from the "High" input level down to the "Simmer" level. It is apparent that the cycle times would become very long at the "Low" and "Simmer" levels if 2400 watts were used over the entire range.

It will be noted from Fig. 4, chart B, that as the progressively lower "heats" are selected, the total cycle time increases, and further that the rate of increase is larger as progressively lower "heats" are chosen. Due to the inherent characteristics of the thermal wattage controller, if chart B were to be projected beyond the "High" heat, i. e. by designing cam 36 to give still higher heats, the cycle times would increase and become increasingly longer until a continuous energization were obtained. Graphically this would result in a generally U-shaped curve of total cycle time to average wattage, with the low point of the U near the middle wattages. The portion of the U-shaped curve shown in Fig. 4, chart B, represents the characteristic of a particular thermal switch having a specific current flowing through its heater during any energization period. In that specific instance the current flowing is approximately 10.2 amperes corresponding to the 2400 wattage series circuit, the heating unit having an approximate resistance of 23.1 ohms. When the switch is operated at a lower current, i. e., 5.1 amperes, by reduction of the voltage to the series circuit of the heating unit 10 and heater 31, the thermal switch provides a total cycle time curve of the same characteristic U-shape. The low point of the curve is likewise in the vicinity of the middle range of wattage taken on the basis that maximum wattage results in continuous energization at the aforementioned current level. By the present invention the middle portion of two such curves are chosen, this composite curve being shown at A of Fig. 4. In other words, by the present invention the thermal switch is caused to operate at the middle of its characteristic U-shaped curve over the entire range of desired "heats," this being accomplished by the utilization of the high and low instantaneous wattages.

Fig. 4 shows further that in the medium heat range the total cycle times are substantially equal regardless of whether 600 watts or 2400 watts are used. By using the 600 watts to obtain the medium heat, there is less tendency for overshoot and undershoot because of the relatively long "on" period when compared to that on use of the 2400 watts instantaneous energization. Further, it will be apparent that if the switch were to be operated over long periods of time in the medium "heat," more contact life could be expected when using 600 watt energization than when using the 2400 watt energization. However, if the 2400 watts energization were used, the system would have the advantage of rapid heating to obtain the preselected temperature. The choice of which wattage to use for obtaining the medium "heat" can be seen to depend upon the arbitrary specifications that may be set up by the user or the manufacturer.

It will be understood, of course, that the invention contemplates such modifications and embodiments as may occur to those skilled in the art, without limitation to the specific disclosure herein.

I claim:

1. In an electrical control system, an electric heating unit of a predetermined maximum continuous wattage capacity, means to supply two different voltages for selective application to said heating unit, the higher voltage giving a wattage greater than said wattage capacity and the lower voltage giving a wattage less than said wattage capacity, a manually adjustable member having different positions for preselection of a number of different "heats," means controlled by said member for applying said higher voltage to said heating unit upon selection of predetermined higher "heats" and for applying said lower voltage to said heating unit upon selection of predetermined lower "heats," and means adjustable by said member for effecting intermittent energization of said heating unit to give said "heats."

2. In an electrical control system, an electric heating unit of a predetermined maximum continuous wattage capacity, means to supply two different voltages for selective application to said heating unit, the higher voltage giving a wattage greater than said wattage capacity and the lower voltage giving a wattage less than said wattage capacity, a manually adjustable member having different positions for preselection of a number of differ-ent "heats," means controlled by said member for applying said higher voltage to said heating unit upon selection of predetermined higher "heats," and for applying said lower voltage to said heating unit upon selection of predetermined lower "heats," and a cyclically-operable switch in circuit with said heating unit and adjustable by said member for effecting intermittent energization of said heating unit to give said "heats."

3. In an electrical control system, an electric heating unit of a predetermined maximum continuous wattage capacity, means to supply two different voltages for selective application to said heating unit, the higher voltage giving a wattage greater than said wattage capacity and the lower voltage giving a wattage less than said wattage capacity, a manually adjustable member having different positions for preselection of a number of different "heats," means controlled by said member for applying said higher voltage to said heating unit upon selection of predetermined higher "heats" and for applying said lower voltage to said heating unit upon selection of predetermined lower "heats," and a current-operable thermostatic cycling switch in circuit with said heating and adjustable by said member for effecting intermittent energization of said heating unit to give said "heats."

4. In an electrical control system, an electric heating unit of a predetermined maximum continuous wattage capacity, means to supply two different voltages for setive application to said heating unit, the higher voltage giving a wattage greater than said wattage capacity and the lower voltage giving a wattage less than said wattage capacity, a manually adjustable member having different positions for preselection of a number of different "heats," means including a cam-adjustable double-throw switch controlled by said member for applying said higher voltage to said heating unit upon selection of predetermined higher "heats" and for applying said lower voltage to said heating unit upon selection of predetermined lower "heats," and a cam-adjustable current-operable thermostatic cycling switch in circuit with said heating unit and adjustable by said member for effecting intermittent energization of said heating unit to give said "heats."

5. In an electrical control system, an electric heating unit of a predetermined maximum continuous wattage capacity, means to supply from a three-wire supply line two voltages of values 2E and E respectively for selective application to said heating unit, the higher voltage giving a wattage greater than said wattage capacity and the lower voltage giving a wattage less than said wattage capacity, a manually adjustable member having different positions for preselection of a number of different "heats," means controlled by said member for applying said higher voltage to said heating unit upon selection of predetermined higher "heats" and for applying said lower voltage to said heating unit upon seletcion of predetermined lower "heats," and a cyclically-operable switch in circuit with said heating unit and adjustable by said member for effecting intermittent energization of said heating unit to give said "heats."

6. In an electrical control system, an electric heating unit of a predetermined maximum continuous wattage capacity, means to supply from a three-wire supply line two voltages of values 2E and E respectively for selective application to said heating unit, the higher voltage giving a wattage greater than said wattage capacity and the lower voltage giving a wattage less than said wattage capacity, a manually adjustable member having different positions for preselection of a number of different "heats," means controlled by said member for applying said higher voltage to said heating unit upon selection of predetermined higher "heats" and for applying said lower voltage to said heating unit upon selection of predetermined lower "heats," and a current-operable thermostatic cycling switch in circuit with said heating unit and adjustable by said member for effecting intermittent energization of said heating unit to give said "heats."

7. In an electrical control system, an electric heating unit of a predetermined maximum continuous wattage capacity, means to supply from a three-wire supply line two voltages of values 2E and E respectively for selective application to said heating unit, the higher voltage giving a wattage greater than said wattage capacity and the lower voltage giving a wattage less than said wattage capacity, a manually adjustable member having different positions for preselection of a number of different "heats," means including a cam-adjustable double-throw switch controlled by said member for applying said higher voltage to said heating unit upon selection of predetermined higher "heats" and for applying said lower voltage to said heating unit upon selection of predetermined lower "heats," and a cam-adjustable current-operable thermostatic cycling switch in circuit with said heating unit and adjustable by said member for effecting intermittent energization of said heating unit to give said "heats."

8. In an electrical control system, an electric heating unit of predetermined maximum continuous wattage capacity, a double-throw switch having a pair of stationary contacts and a contact movable between said stationary contacts, means to connect one of said stationary contacts to one of the main conductors of a three-wire supply line, means to connect the other stationary contact to the neutral conductor of the supply line, means to connect said movable contact to one terminal of the heating unit, means to connect the other terminal of the heating unit to the other main conductor of the supply line, whereby said switch serves to apply either a higher voltage or a lower voltage to said heating unit, the higher voltage giving a wattage greater than said wattage capacity and the lower voltage giving a wattage less than said wattage capacity, a manually adjustable member having different positions for preselection of a number of different "heats," cam means operable by said member for controlling said switch so as to apply said higher voltage to said heating unit upon selection of predetermined higher "heats" and to apply said lower voltage to said heating unit upon selection of predetermined lower "heats," a current-operable thermostatic cycling switch connected in circuit with said heating unit, and cam means operable by said member to adjust said thermostatic switch according to the selected "heat" so as to cause the thermostatic switch to maintain the selected "heat."

References Cited in the file of this patent

UNITED STATES PATENTS

| | | |
|---|---|---|
| 2,210,947 | Myers et al. | Aug. 13, 1940 |
| 2,389,014 | Weber | Nov. 13, 1945 |
| 2,402,354 | Waddell | June 18, 1946 |
| 2,404,139 | McCormick | July 16, 1946 |
| 2,410,013 | Clark | Oct. 29, 1946 |
| 2,410,014 | Clark | Oct. 29, 1946 |
| 2,427,945 | Clark et al. | Sept. 23, 1947 |
| 2,541,314 | Weber et al. | Feb. 13, 1951 |
| 2,549,461 | Haller | Apr. 17, 1951 |